(12) United States Patent
Martinsons

(10) Patent No.: US 9,067,764 B2
(45) Date of Patent: Jun. 30, 2015

(54) SWING DAMPER WITH DISC BRAKES

(75) Inventor: Andris Martinsons, Salaspils (LV)

(73) Assignee: BALTROTORS, SIA, Salaspils (LV)

( * ) Notice: Subject to any disclaimer, the term of this patent is extended or adjusted under 35 U.S.C. 154(b) by 33 days.

(21) Appl. No.: 13/979,286

(22) PCT Filed: Feb. 7, 2012

(86) PCT No.: PCT/LV2012/000003
§ 371 (c)(1),
(2), (4) Date: Jul. 11, 2013

(87) PCT Pub. No.: WO2012/108750
PCT Pub. Date: Aug. 16, 2012

(65) Prior Publication Data
US 2013/0284546 A1    Oct. 31, 2013

(30) Foreign Application Priority Data
Feb. 11, 2011    (LV) .......................................... P-11-18

(51) Int. Cl.
*F16F 7/02*   (2006.01)
*B66C 3/00*   (2006.01)

(52) U.S. Cl.
CPC ................ *B66C 3/005* (2013.01); *F16F 7/023* (2013.01)

(58) Field of Classification Search
CPC ................................. B66C 3/005; F16F 7/023
USPC .......... 188/83, 381; 294/106, 119.4; 403/146; 414/738, 626
See application file for complete search history.

(56) References Cited

U.S. PATENT DOCUMENTS

| | | | | |
|---|---|---|---|---|
| 3,301,587 A | * | 1/1967 | Heikkinen | 294/67.21 |
| 4,810,020 A | * | 3/1989 | Powell | 294/119.4 |
| 5,110,169 A | * | 5/1992 | Shepherd et al. | 294/119.4 |
| 5,451,087 A | * | 9/1995 | Beaulieu | 294/119.4 |
| 6,264,013 B1 | * | 7/2001 | Hodgins | 188/83 |
| 7,721,857 B2 | * | 5/2010 | Harr | 188/381 |

FOREIGN PATENT DOCUMENTS

| | | |
|---|---|---|
| EP | 1 551 748 A1 | 7/2005 |
| EP | 2437998 B1 * | 11/2012 |
| WO | WO 00/53522 A1 | 9/2000 |
| WO | WO 2004/031067 A1 | 4/2004 |
| WO | WO 2010/140947 A1 | 12/2010 |

* cited by examiner

*Primary Examiner* — Anna Momper
(74) *Attorney, Agent, or Firm* — Dickstein Shapiro LLP

(57) ABSTRACT

A swing damper (1) for dampening swinging motion of working element, comprising an upper part (2), that is connected to a suspension, and a lower part (3), that is connected to a rotator, wherein the upper part (2) and the lower part (3) are pivotally connected to each other, wherein between the upper part (2) and the lower part (3) are arranged discs (7, 8, 9,10, 11), which can swing around central axis (6), wherein at least one of said discs (7, 8) is secured against rotation relative to the upper part (2) and at least one of said discs (9, 10, 11) is secured against rotation relative to the lower part (3), whereby the upper part (2) and the lower part (1) are pivotally connected to each other through a whole center pin (14), and whereby the swing damper (1) comprises tensioning elements (20, 21, 22) operating to press the discs (7, 8, 9,10, 11) together during the swing dampening operation, wherein the tensioning elements (20, 21, 22) are arranged at least in one or more discs (7, 8, 10, 11).

8 Claims, 5 Drawing Sheets

SWING DAMPER WITH DISC BRAKES

FIELD OF THE INVENTION

Figure 1:
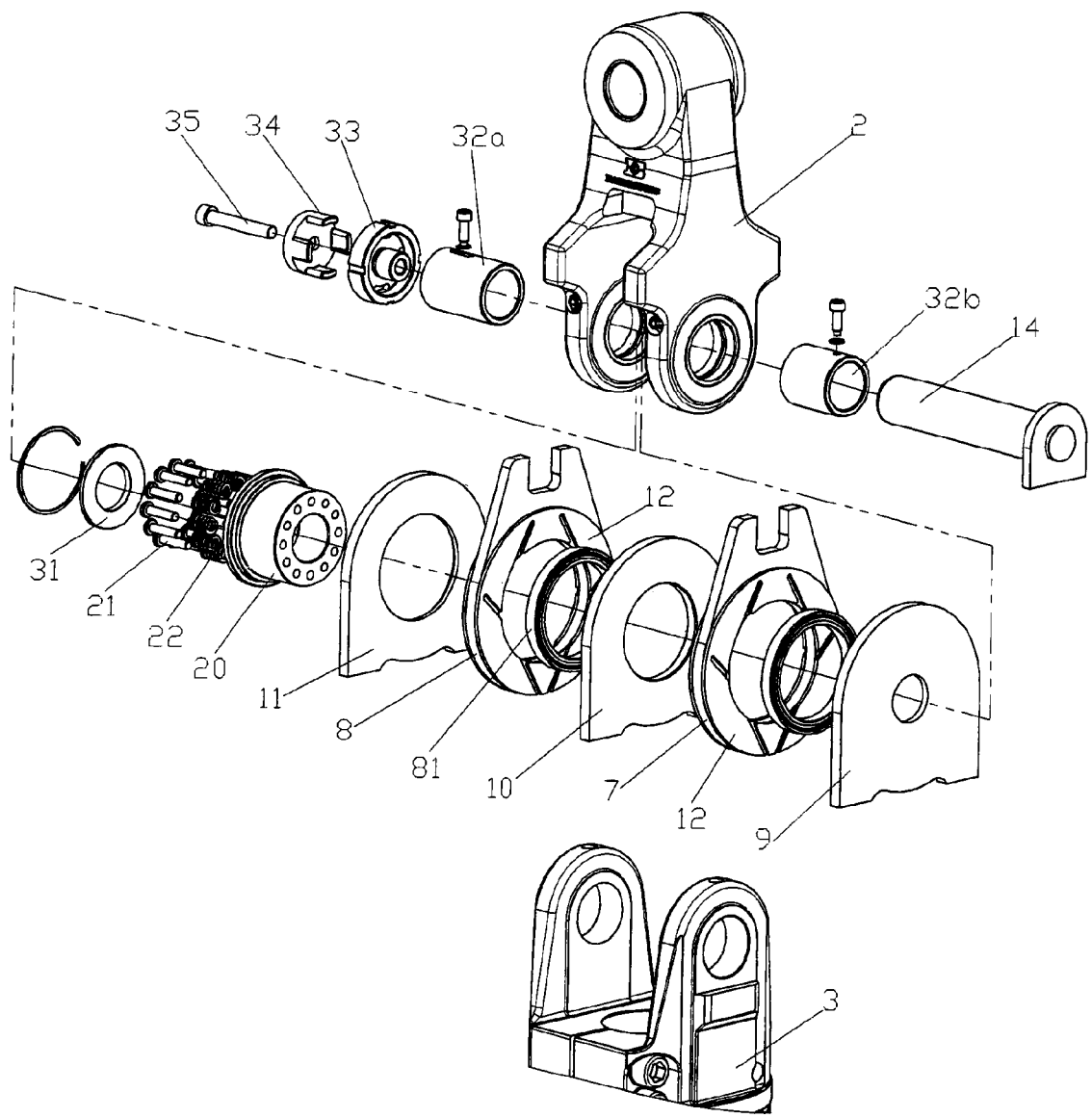

Invention refers to swing dampers, in particular to the swing dampers comprising disc brakes.

Swing dampers are used in suspensions that crane arm of hydraulic crane to rotator that drives actuators: grabs, grapples and the like hydraulic actuators. The swing damper dampens oscillations of actuator during its operation.

BACKGROUND OF THE INVENTION

There is known U.S. Pat. No. 5,110,169 that describes swing damper comprising plurality of braking discs that tensioned by means of screw and disc spring. Assembly of disc brakes is disposed beyond and out of swinging connection. Such a construction increases a size of the swing damper and not suitable for compact size excavators, grabbers and grapplers, as well as increases a risk to brake said construction by means of outer action. Swing damper of similar construction is described in U.S. Pat. No. 4,335,914.

Typical swing damper, that comprises disc brakes, is described in European Patent No. EP 1551748. In the European patent is described the swing damper for dampening swinging motion of tool, which comprises an upper part that is connected to a suspension and a lower part that is connected to a rotator. The upper part and the lower part are pivotally connected to each other via a pivot joint. Discs are arranged between the upper part and the lower part enabling them to swing around an axle. At least one of said discs is secured against rotation relative to the upper part and at least one of said discs is secured against rotation relative to the lower part. The swing damper includes tensioning elements which functions to press the discs during dampening operation.

Given invention from known constructions is characterized in that tensioning elements are located at least partially within one or two pivot bearing located between the upper part and the lower part. Such an arrangement of the tensioning elements decreases a rigidity or stiffness of said swing damper.

OBJECTIVE AND SUMMARY OF THE INVENTION

Aim of the invention is to design swing damper comprising disc brakes with improved rigidity or stiffness and reliability.

Aim of the invention is reached by designing the swing damper for dampening swinging of tool that comprises an upper part that is connected to a suspension and a lower part that is connected to a rotator. The upper part and the lower part are pivotally connected to each other via central axis. Between the upper part and the lower part are arranged discs, which can swing around central axis, and at least one of said discs is secured against rotation relative to the upper part and at least one of said discs is secured against rotation relative to the lower part. The upper part and the lower part are pivotally connected to each other through a whole centre pin. Inserting whole centre pin increases stiffness of the swing damper, but there is no more a possibility to dispose tensioning elements within one or two pivot bearings that are disposed between the upper part and the lower part. To solve this problem a swing damper was designed, characterized in that it comprises tensioning elements operating to press the discs together during the swing dampening operation, wherein the tensioning elements are arranged at least in one or more discs. Surprisingly it was found out that such a design, where tensioning elements are arranged in discs not in pivot bearings, is more protected from excessive bending loads and increases an overall stiffness of the swing damper. The tensioning elements are located within at least one or more braking discs retaining compact arrangement of the swing damper.

The tensioning elements are insert, tightening member and spring. Within the insert in its axial direction and around its central axis are disposed plurality of seats, preferably twelve seats, wherein in each seat is arranged tightening element and spring. The insert is connected to at least one of the discs of the upper part via a rolling bearing, wherein at least one of the discs of the lower part is mounted with sliding fit on the insert.

To control a tensioning force of the tensioning elements, the swing damper further comprises a control device of the tensioning elements comprising a screw, by means of which tensioning force is adjusted, a strap, a nut and a movable insert, by means of which movement of screw is transferred onto a plate, which abuts against the tightening member. At least one disc of the lower part is mounted with sliding fit on centre pin and acts as fixed disc.

DETAILED DESCRIPTION OF THE INVENTION

Figure 2:
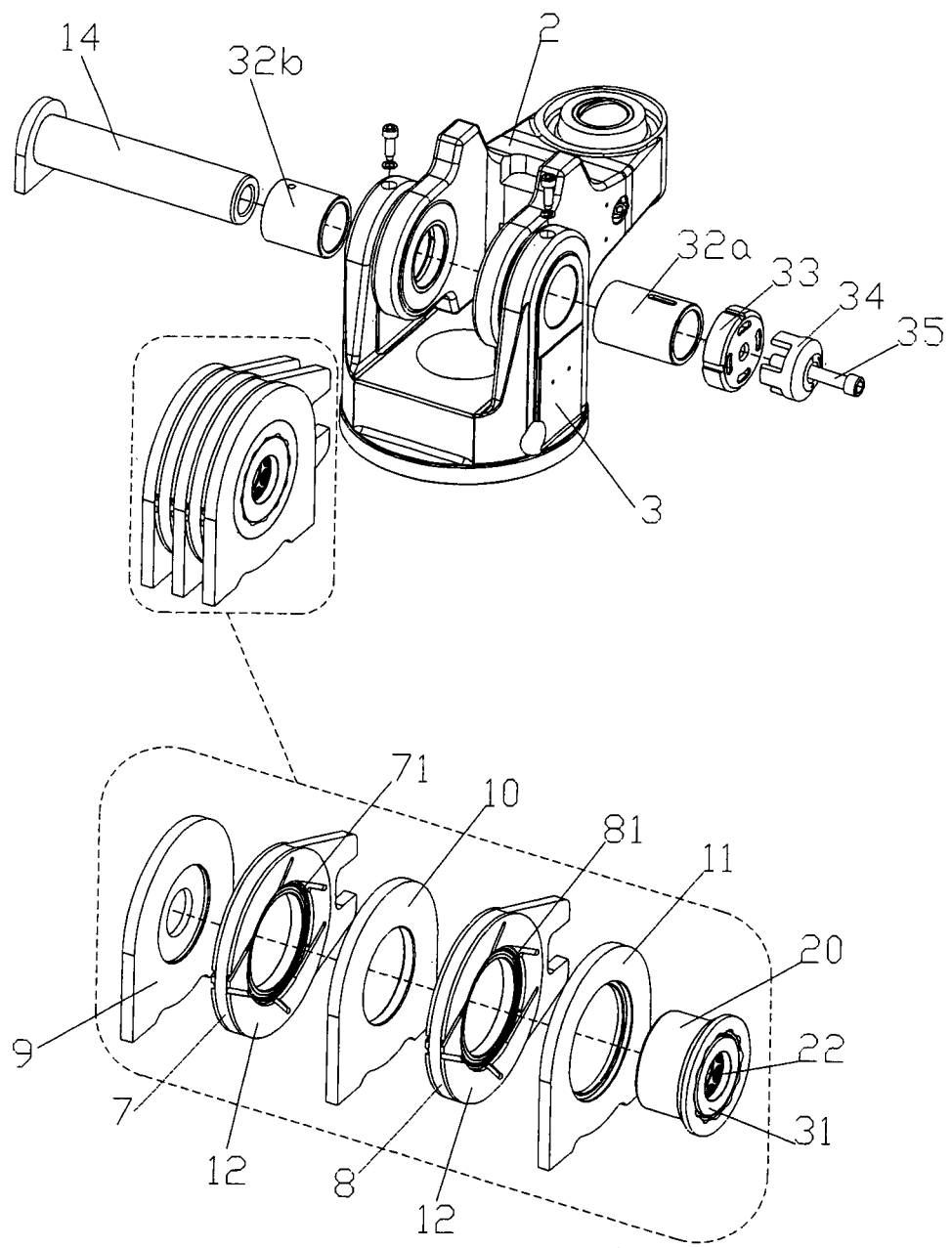
Figure 3:
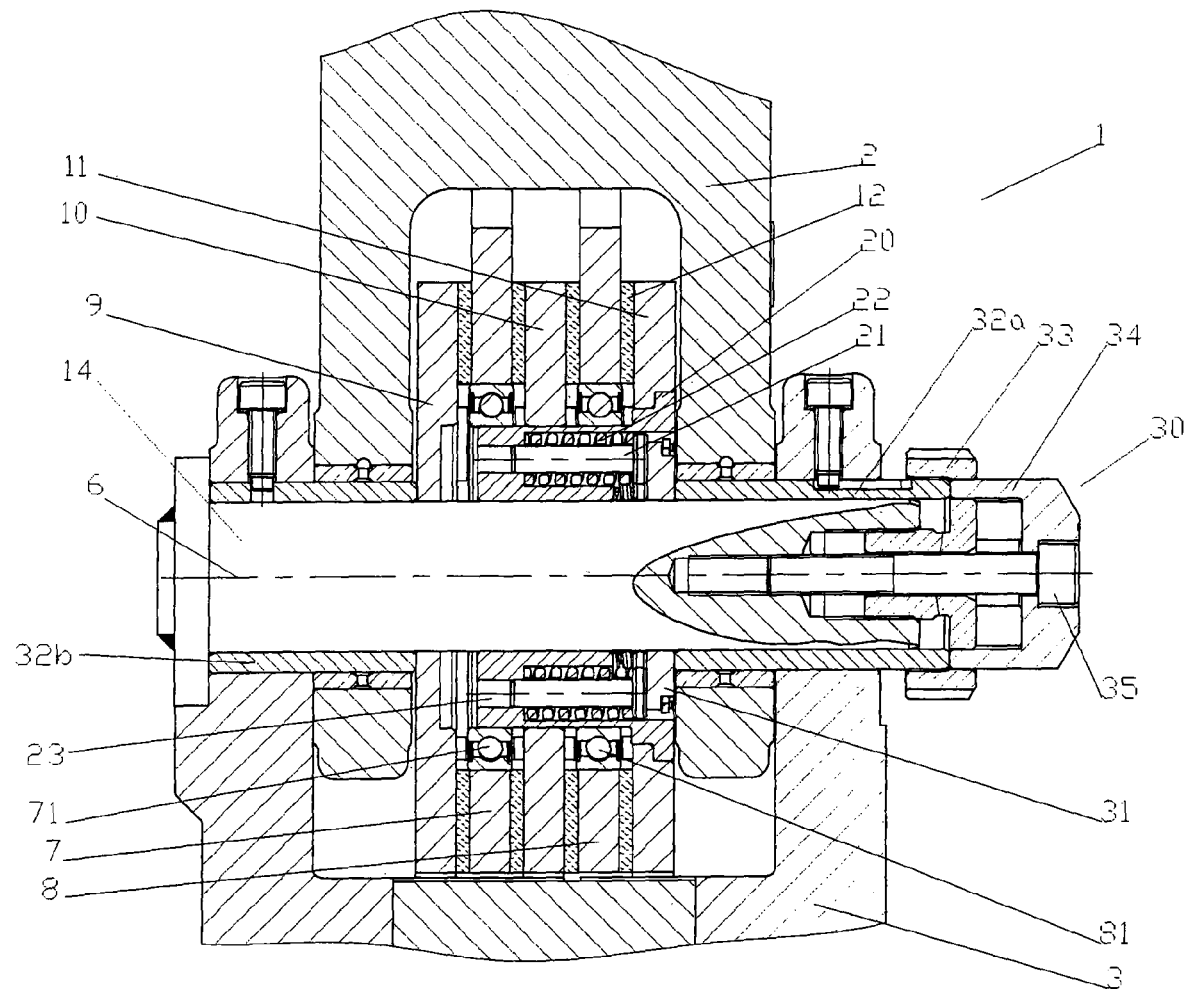
Figure 4:
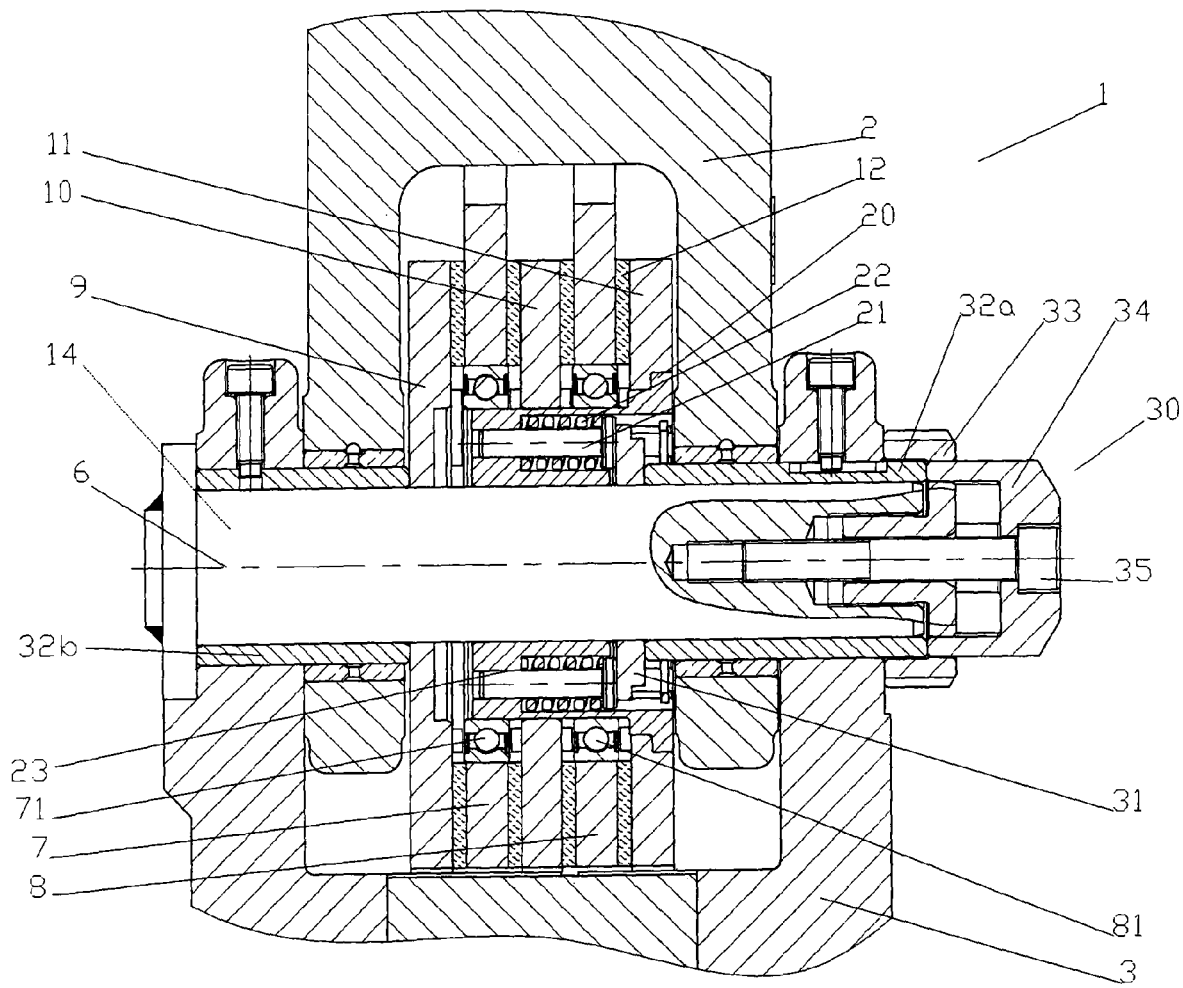
Figure 5:
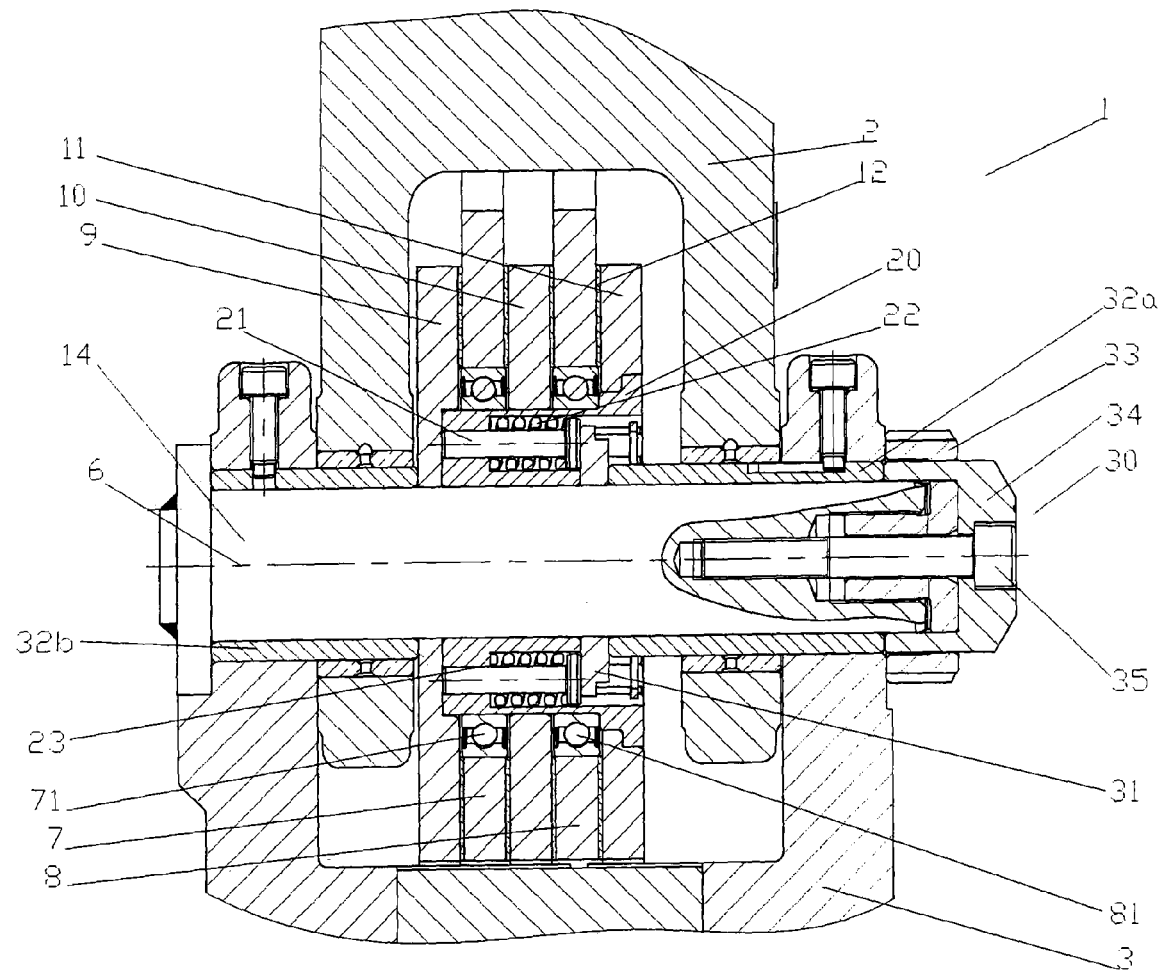

The invention is described by the following drawings:

FIG. 1—the swing damper comprising disc brakes in exploded view;

FIG. 2—the swing damper in partially assembled state;

FIG. 3—the swing damper in assembled state;

FIG. 4—the swing damper when discs are pushed together during operation;

FIG. 5—the swing damper in its final position when discs are completely pushed together compensating wear of friction material of discs.

The swing damper 1, comprising disc brakes, is illustrated in FIG. 1. In the given figure it is clearly seen an invention with characterized elements, such like whole centre pin 14 and the tensioning elements, such as inserts 20, tightening members 21 in form of pins and cylindrical springs 22. Assembling the said swing damper, said tensioning elements 21 together with springs 22 are inserted into recesses 23 of the insert 20 and covered with disc type plate 31 as shown in FIG. 2. Cavity is made in the distal disc 9 to provide axial movement of tensioning discs 20, 21 and 22 within the discs. Complete set of discs 7, 8, 10 and 11 and tensioning elements 20, 21 and 22 is inserted between the upper part 2 and the lower part 3 of the swing damper (see FIG. 2). Respectively, the discs 9, 10 and 11 are coupled to the lower part 3 and the discs 7 and 8 are coupled to the upper part 2. For controlling a tensioning force of the tensioning elements 20, 21 and 22, the swing damper 1 further comprises control device 30 of tensioning elements 20, 21 and 22, that comprises the screw 35, by means of which the tensioning force is adjusted, the strap 34, the nut 33 and the movable insert 32*a*, by means of which a movement of the screw 35 and the strap 34 are transferred to the disc type plate 31, that abuts against the tightening members 21 made in form of pins. Inserts 32*a* and 32*b*, that are arranged between ears of the upper part 2 and the lower part 3 are arranged, has a function of a hinge. Further the insert 32*b* is movable along and parallel to the centre axis 6.

The swing damper 1 in its cross section is illustrated in FIGS. 3, 4 and 5. The swing damper 1 in assembled state is illustrated in FIG. 3, when tensioning elements 20, 21 and 22 are not in tensioned position. In FIG. 4 is illustrated the swing damper 1 in a position, when tensioning elements 20, 21 and 22 are in tensioned position so that due to their action the discs 7, 8, 9, 10 and 11 are pressed against each other in such a way that friction force is generated between its surfaces of friction material. Due to said friction force oscillation or swinging of suspension is dampened providing effective operation of the swing damper 1. In FIG. 5 is illustrated the swing damper 1 in a position, when the discs 7, 8, 9, 10 and 11 are pressed together completely and the insert 20 is in its end or final position. An end surface of the insert 20 abuts against the cavity made within the disc 9. In this case it is necessary to change the discs 7 and 8, because its friction material 12 do not provide a necessary friction to damp oscillations or swinging of the system.

PREFERRED EMBODIMENT OF THE INVENTION

The best mode for a swing damper comprising disc brakes is the swing damper that comprises the upper part 2 connected to a suspension (not shown on drawings) or can be as a part of a suspension and the lower part 3 connected to a rotator (not shown on drawings). The lower part 3 can be connected to the rotator directly or via an adapter. The upper part 2 and the lower part 3 are pivotally connected to each other by means of whole centre pin 14. Discs 7, 8, 9, 10 and 11 are disposed between the upper part 2 and the lower part 3 and they can rotate around the centre axis 6. Especially two discs 7 and 8 are secured against rotation relative to the upper part 2. Three discs 9, 10 and 11 are secured against rotation to the lower part 3. The swing damper 1 comprises the tensioning elements, especially one insert 20, twelve tensioning elements 21 and twelve cylindrical springs 22, that operate all together to press the discs 7, 8, 9, 10, 11 together during the oscillation braking operation. The tensioning elements 20, 21 and 22 are disposed within the discs 7, 8, 10 and 11. In the insert 20 in its axial direction and around its centre axis with a gap are made twelve seats 23, wherein in each seat 23 is disposed the tensioning element 21 and the spring 22. The heads of the tensioning elements 21 are closed by disc type plate 31. The insert 20 is connected to the both discs 7 and 8 of the upper part 2 via rolling bearings 71 and 81. Both discs 10 and 11 of the lower part 3 are mounted with a sliding fit onto the insert 20. The disc 9 of the lower part 3 is mounted with a tight fit onto the centre pin 14 and it operates as fixed disc 9.

To control a tensioning force of the tensioning elements 20, 21 and 22, the swing damper 1 further comprises a control device 30 of the tensioning elements 20, 21 and 22, wherein device 30 comprises the screw 35, by means of which tensioning force is adjusted, the strap 34, the nut 33 and movable insert 32a, by means of which a movement of the screw 35 is transferred onto a disc type plate 31, which abuts against twelve tightening members 21.

Given invention is not restricted by embodiments of invention described herein. Those skilled in the art can change or modify given embodiments without departing from the spirit and scope of the invention.

The invention claimed is:

1. A swing damper for dampening swinging motion of a working element, comprising an upper part, that is connectable to a suspension, and a lower part, that is connectable to a rotator, wherein the upper part and the lower part are pivotally connected to each other, wherein a plurality of discs are arranged between the upper part and the lower part, wherein the plurality of discs can swing around a central axis, wherein the plurality of discs includes a first disc and a second disc, wherein the first disc is secured against rotation relative to the upper part, and the second disc is secured against rotation relative to the lower part, wherein the upper part and the lower part are pivotally connected to each other through a whole center pin, wherein the swing damper comprises tensioning elements operating to press the plurality of discs together during the swing dampening operation, and wherein the tensioning elements are arranged at least in one or more of the plurality of discs, and wherein the tensioning elements include an insert, tightening members, and springs, and wherein the insert has an axial direction and a central axis, and wherein seats are disposed within the insert in the axial direction of the insert and around central axis of the insert, and wherein a tightening member and a spring are arranged in each seat.

2. A swing damper as claimed in claim 1, wherein to control tensioning force of the tensioning elements, the swing damper further comprises a control device of the tensioning elements comprising a screw, by which tensioning force is adjusted, a strap, a nut, and a movable insert, by which movement of the screw is transferred onto a plate, which abuts against the tightening members.

3. A swing damper as claimed in claim 1, wherein the second disc is mounted with a sliding fit onto the center pin.

4. A swing damper for dampening swinging motion of a working element, comprising an upper part, that is connectable to a suspension, and a lower part, that is connectable to a rotator, wherein the upper part and the lower part are pivotally connected to each other, wherein a plurality of discs is arranged between the upper part and the lower part, wherein the plurality of discs can swing around a central axis, wherein the plurality of discs includes a first disc and a second disc, wherein the first disc is secured against rotation relative to the upper part, and the second disc is secured against rotation relative to the lower part, wherein the upper part and the lower part are pivotally connected to each other through a whole center pin, wherein the swing damper comprises tensioning elements operating to press the plurality of discs together during the swing dampening operation, and wherein the tensioning elements are arranged at least in one or more of the plurality of discs, and wherein the tensioning elements include an insert, a tightening member, and a spring, and wherein the insert has an axial direction and a central axis, and wherein seats are disposed within the insert in the axial direction of the insert and around the central axis of the insert, and wherein a tightening member and a spring are arranged in each seat.

5. A swing damper as claimed in claim 4, wherein the insert is connected to the first disc via a bearing, and wherein the second disc is mounted with a sliding fit on the insert.

6. A swing damper as claimed in claim 4, wherein to control tensioning force of the tensioning elements, the swing damper further comprises a control device of the tensioning elements comprising a screw, by which tensioning force is adjusted, a strap, a nut, and a movable insert, by which movement of the screw is transferred onto a plate, which abuts against the tightening members.

7. A swing damper for dampening swinging motion of a working element, comprising an upper part, that is connectable to a suspension, and a lower part, that is connectable to a rotator, wherein the upper part and the lower part are pivotally connected to each other, wherein a plurality of discs are arranged between the upper part and the lower part, wherein the plurality of discs can swing around a central axis, wherein the plurality of discs includes a first disc and a second disc, wherein the first disc is secured against rotation relative to the upper part, and the second disc is secured against rotation relative to the lower part, wherein the upper part and the lower part are pivotally connected to each other through a whole center pin, wherein the swing damper comprises tensioning elements operating to press the plurality of discs together during the swing dampening operation, and wherein the tensioning elements are arranged at least in one or more of the plurality of discs, and wherein the tensioning elements include an insert, and wherein the insert is connected to the first disc via a bearing, and wherein the second disc is mounted with a sliding fit on the insert.

8. A swing damper as claimed in claim 7, wherein to control tensioning force of the tensioning elements, the swing damper further comprises a control device of the tensioning elements comprising a screw, by which tensioning force is adjusted, a strap, a nut, and a movable insert, by which movement of the screw is transferred onto a plate, which abuts against the tightening members.

* * * * *